United States Patent [19]

Badavas

[11] Patent Number: 5,150,289
[45] Date of Patent: Sep. 22, 1992

[54] METHOD AND APPARATUS FOR PROCESS CONTROL

[75] Inventor: Paul C. Badavas, Southboro, Mass.

[73] Assignee: The Foxboro Company, Foxboro, Mass.

[21] Appl. No.: 559,645

[22] Filed: Jul. 30, 1990

[51] Int. Cl.$^5$ ...................... G06F 15/46; G05B 13/02
[52] U.S. Cl. .................................. 364/154; 364/153; 364/148
[58] Field of Search ............... 364/152, 153, 154, 155, 364/157, 185, 582, 148

[56] References Cited

U.S. PATENT DOCUMENTS

| 3,515,860 | 6/1970 | Fitzgerald, Jr. | 364/155 |
|---|---|---|---|
| 3,876,872 | 4/1975 | Spitz | 364/154 |
| 3,878,982 | 4/1975 | Hoffman | 364/154 |
| 3,881,651 | 5/1975 | Wilhelm, Jr. | 364/154 |
| 3,995,478 | 12/1976 | Wilhelm, Jr. | 364/153 |
| 4,602,326 | 7/1986 | Kraus | 364/158 |
| 4,855,897 | 8/1989 | Shinskey | 364/148 |

OTHER PUBLICATIONS

D. L. Ulery, *Software Requirements for Statistical Quality Control*, Instrument Society of America, International Conference and Exhibit (Oct. 1986).
Badavas et al., *Statistical Process Control Embedded in Open Industrial Systems*, Instrument Society of America, International Conference and Exhibit (Oct. 1988).
Epperly et al., *Statistical Process Control Integrated with Distributed Control Systems*, National Petroleum Refiners Association Computer Conference (Oct. 1988).
J. F. MacGregor, *On-Line Statistical Process Control*, Chemical Engineering Progress (Oct. 1988).
Badavas et al., *Meeting the Challenges of the '90's with the Intelligent Automation Series*, Foxboro Co., Presentation on the I/A Series as Applied to Paper and Pulp Industry (May 1988).

*Primary Examiner*—Jerry Smith
*Assistant Examiner*—Paul Gordon
*Attorney, Agent, or Firm*—Lahive & Cockfield

[57] ABSTRACT

A statistical process control system provides asymmetrical nonlinear automatic closed-loop feedback control. The system has application, for example, in the control of equipment that responds to a controlled variable signal to vary a measurable characteristic of a process. The system uses an accumulated deviation of a measured subgroup means minus a target value, divided by the subgroup standard deviation, to modify the manipulated variable each time the accumulated value exceeds a decision interval above or below the target. The system permits the use of independent slack variables subtracted from the accumulated deviation to more closely model the underlying process. Likewise, the system permits the use of independent alarm values and variable gains to permit greater control of the process.

39 Claims, 3 Drawing Sheets

METHOD AND APPARATUS FOR PROCESS CONTROL

BACKGROUND OF THE INVENTION

This invention relates to process control and, more particularly, to improved apparatus and methods for statistical control of processes.

Process control is a method for controlling the operational parameters of a process by monitoring one or more of its characteristics over time. It is used to ensure that the quality and efficiency of the process do not vary substantially during a single run or over the course of several runs. While process control is typically employed in the manufacturing industry, it also has application in the service industry.

One form of process control, statistical process control (SPC), relies on statistical analysis of process variables to ensure that the process is operating in a desired manner. SPC is based on the assumption that there is a random variation in the values of each variable (e.g., tensile strength, degree of brightness, etc.) that serves as a measure of process quality or efficiency. If those variables consistently exhibit a normal distribution pattern (e.g., Gaussian) within established limits, then the process is in statistical control. Variation from this normal distribution indicates that the process is not in statistical control.

For example, brightness may be an indicator of the quality of paper produced by a particular manufacturing process. To ensure that the process is in control, brightness values are measured at discrete intervals during a run, i.e., during operation of the process. By plotting those values and comparing them with a desired target brightness level, it is possible to detect undesirable shifts in the process. Once alerted, the operator can take compensating steps, such as increasing or conversely reducing the amount of bleaching agent added to the batch.

Among the prior art SPC methods is the cumulative sum (CUSUM) procedure. This employs a form of a sequential likelihood ratio test that evaluates the hypothesis that the mean of a process is equal to a target value against the alternative hypothesis that the mean deviates from that value by a specified amount.

As described for example by Ulery, "Software requirements for Statistical Quality Control," Instrument Society of America Paper #86-2713 (1986), a computational CUSUM procedure tracks two cumulative sums, a high-value sum $S_H$ and a low-value sum $S_L$, expressed as follows:

$$S_H(i) = \max[0, Y_i - k + S_H(i-1)]$$

$$S_L(i) = \max[0, -k - Y_i + A_L(i-1)]$$

where, $Y_i$ is a standardized variable equal to the observed value sample average minus the target value divided by the standard deviation of the sample average, k is a slack value, and max[...] is a function that returns the value of its numerically largest parameter.

Prior SPC systems using this CUSUM method signal an out-of-control situation when either $S_H$ or $S_L$ exceeds a predetermined alarm value. Typically, an operator responds to the signal by deciding what action, if any, to take with respect to the alarm condition.

While prior CUSUM systems have met at least limited success, they do not permit accurate control of a wide range or variety of processes. Accordingly, an object of this invention is to provide improved apparatus and methods for statistical process control.

A further object of the invention is to provide an improved process control system that statistically interprets measured process variables to identify out-of-control situations and automatically corrects them.

SUMMARY OF THE INVENTION

The invention attains the aforementioned objects by providing a control method and apparatus that utilize asymmetrical nonlinear closed-loop feedback to maintain a controlled process variable close to a desired target value.

In one aspect, the invention provides a system for closed-loop control of equipment that performs a process and that responds to a controlled variable signal (e.g., one regulating the amount of bleaching agent) to vary a measurable characteristic (e.g., paper brightness) of the process. The system monitors values of the characteristic to generate signals representative of the mean, or average, and of the standard deviation of those monitored values. An error signal is generated as the difference between the mean signal and a signal representing a target value of the monitored characteristic, divided by the value of the standard deviation signal.

The system monitors the error signal to detect selected changes in the process by generating two disparate or extreme-value accumulation signals. One is a high-value accumulation signal that represents a time-wise summation of successive values of the difference between the error signal and a predetermined high slack value. The other is a low-value accumulation signal that represents a time-wise summation of successive values of the difference between a negated error signal and a predetermined low slack value. The high slack value and the low slack value, which may for example be specified by the operator at run time, are independent of one another. That is, although the operator may set the values equal to each other, in principal they can be set to different levels. This independence of the disparate accumulation signals permits enhanced accurate control of a wide range of manufacturing processes.

A manipulated variable signal, generated in part from the high-value and low-value accumulation signals, is automatically applied to the process-performing equipment to drive the measured characteristic to the target value. This manipulated variable signal represents a numerical sum of a prior value of the signal and scaled values of the high-value and low-value accumulation signals.

Other aspects of the invention relate to mechanisms for grouping measured values of the process control variable for generating the aforementioned average and standard deviation values. According to one such mechanism, successive groups of (n) sampled values are sampled every (n) values. According to another aspect, successive groups of (n) values are sampled every (n+m) values, where (n) and (m) are each integers. In still another aspect, successive groups are formed by combining newly sampled values with sampled values from a prior group.

These and other aspects of the invention are evident in the description which follows and in the accompanying drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
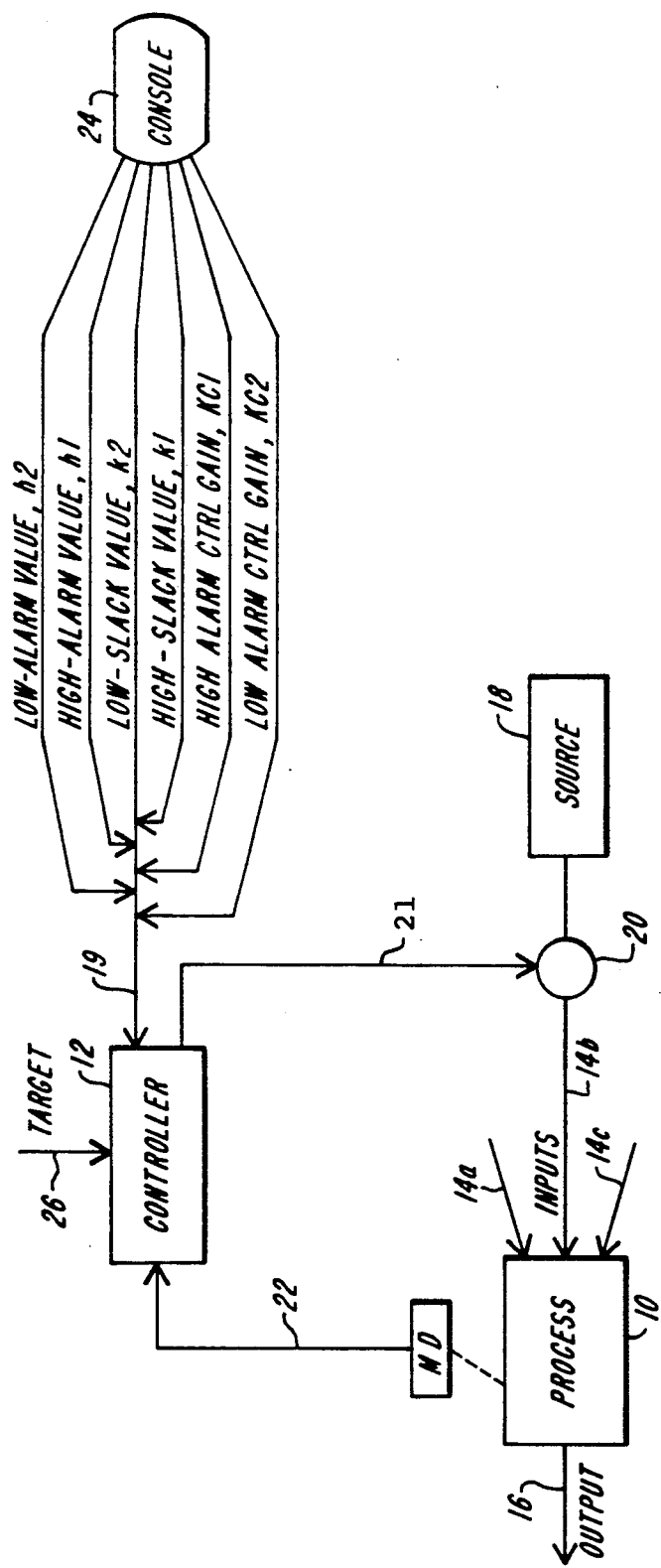
FIG. 1 is a block schematic drawing of an exemplary process under control by a controller in accord with the invention.

FIG. 1 depicts an exemplary process 10 under the control of a controller 12 constructed in accord with a preferred practice of the invention. The process 10 represents any conventional manufacturing or service process that utilizes multiple inputs 14a, 14b and 14c to produce an output 16. For example, process 10 can be a paper manufacturing process in which pulp, bleaching agents, and utilities are supplied along input lines 14a, 14b and 14c to produce a paper roll 16.

An illustrated source 18 supplies one of the process inputs 14b. In the above example, that source 18 may be a chemical tank supplying a bleaching agent. The output of the source 18 is regulated by the controller 12 via a regulator 20. The regulator can, for example, be a conventional flow valve that responds to a manipulated variable signal received on line 21 to control the quantity of material input to the process 10 from the source 18.

In operation, a conventional measuring device, designated MD, measures a characteristic, i.e., a controlled variable, of the process 10. In the above example, the measuring device can be an optical sensor arranged to generate a signal representative of the brightness of the rolled paper produced by the process 10. The controlled variable signal is routed to the controller 12, via line 22 from the measuring device. The controller 12, in turn, produces a manipulated variable output signal based on subgroups of the measured values, as well as on a target signal it receives via a line 26. This target signal represents a desired value of the controlled variable, e.g., the desired brightness of the paper. As discussed in greater detail below, the value of the manipulated variable signal is also based on a low-alarm value signal, a high-alarm value signal, a low-slack value signal, a high-slack value signal, a low-alarm controller gain signal and a high-alarm controller gain signal. In the illustrative embodiment shown, these signals are produced under operator control by way of an operator input/output console 24.

Figure 2:
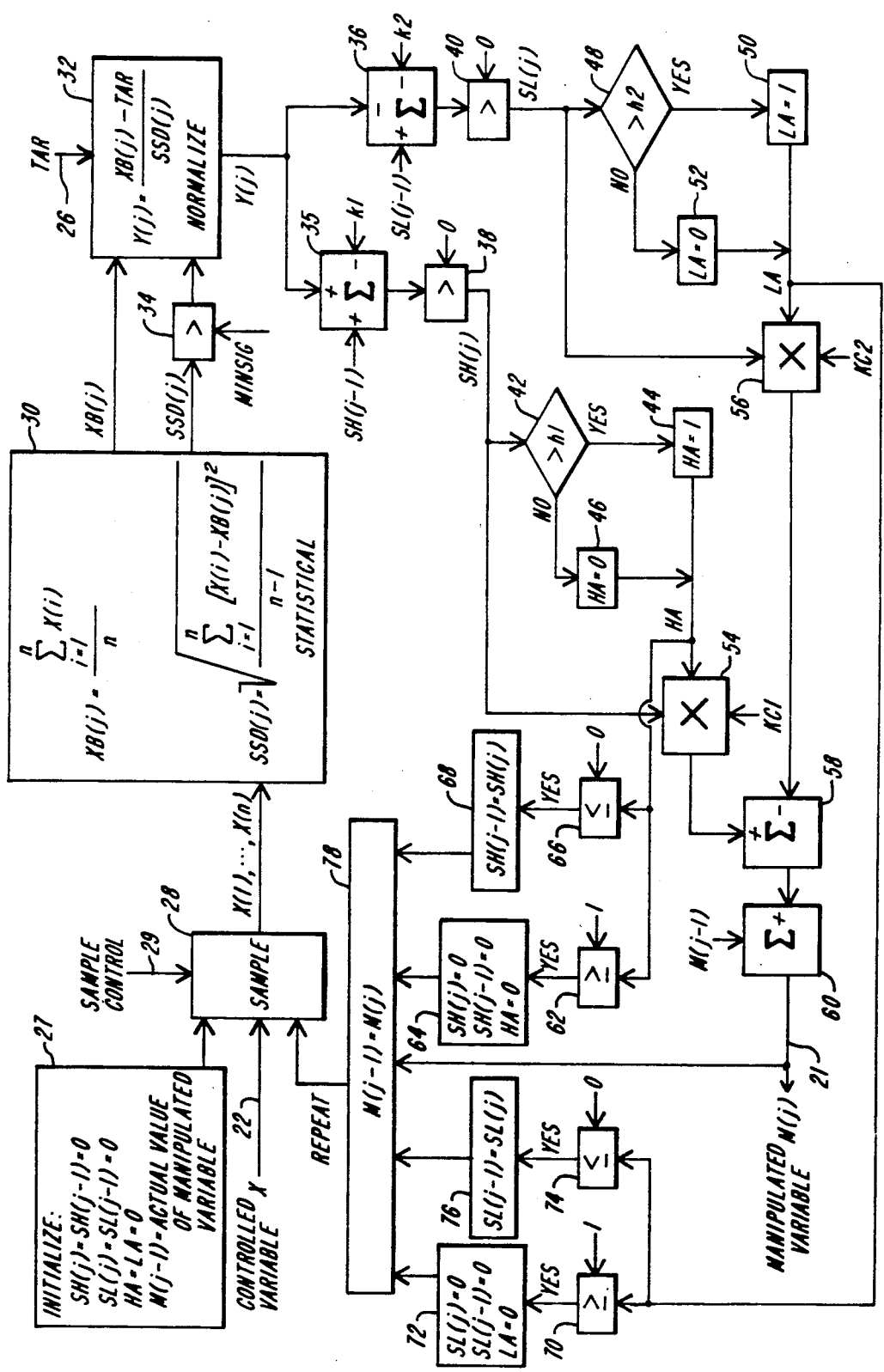
FIG. 2 is a functional block diagram of a process controller in, accord with a preferred practice of the invention.

FIG. 2 shows a construction of the controller 12 of FIG. 1 in accord with a preferred practice of the invention. The illustrated controller includes an initialization element 27 for setting the following initial signal levels. The term (j) is an index number identifying position in a sequence such as a time sequence.

| Signal Name | Description | Initial Value |
| --- | --- | --- |
| SH(j) | current high-value accumulation signal | 0 |
| SH(j-1) | prior high-value accumulation signal | 0 |
| SL(j) | current low-value accumulation signal | 0 |
| SL(j-1) | prior low-value accumulation signal | 0 |
| HA | high-alarm signal | 0 |
| LA | low-alarm signal | 0 |

The initialization element 27 additionally sets a prior manipulated variable signal, MA(j−1), to a value equal to the actual value of the manipulated process input, e.g., the initial flow rate of the measured variable.

Once initialization is complete, a sampling element 28 receives, from the controlled variable measuring device MD (FIG. 1), signals representing values of a controlled variable X. The sampling element samples discrete ones of those values to generate subgroup signals $X(1), X(2), \ldots X(n)$; where (n) is an integer determined in accord with the type of process 10 being controlled.

The sampling element 28 produces the subgroup signals according to any of three sampling mechanisms. The first mechanism generates successive subgroups each of (n) measured values, where a new subgroup is formed every (n) values. According to this mechanism, for example, a first subgroup may include the first fifteen brightness measurements taken during consecutive time intervals of, say, three minutes each; a second subgroup may include the next fifteen measurements; and so forth.

Alternatively, the sampling element 28 generates successive subgroups each of (n) measured values, where each new subgroup is formed (m) intervals after the prior subgroup is completed. Thus, for example, a first subgroup may include the first fifteen brightness measurements taken from the process; a second subgroup may include fifteen measurements taken thirty minutes after the first subgroup is complete; and so forth. This sampling mechanism is preferably used with continuously sampled variables to reduce correlation between consecutive subgroups.

As a third alternative, the sampling element generates successive subgroups of (n) measured values each, where each subgroup is formed, in part, from values included in a prior subgroup and, in part, with newly measured values. Thus, for example, a first subgroup may include the first five brightness measurements taken from the process; a second subgroup may include the last four values of the first subgroup in addition to a newly measured value; a third subgroup may include the third through seventh brightness values, and so forth. This sampling mechanism is preferably used for processes in which there is a relatively long time between measurements of the controlled variable as, for example, where controlled variable measurement data is entered manually.

A control signal specifying which of the aforementioned sampling mechanisms is provided to the sampling element 28 along input line 29. This control signal is typically specified at or before process run-time by the operator by way of the console 24 (FIG. 1).

Subgroup sample value-representative signals $X(1), X(2) \ldots X(n)$ generated by the sampling element 28 are applied to a statistical element 30. This element generates signals XB(j) and SSD(j) representing, respectively, the mean and the standard deviation of each set of subgroup values. The means and the standard deviation are computed in accord with conventional statistical mathematics, as follows:

$$XB(j) = \frac{\sum_{i=1}^{n} X(i)}{n} \qquad (Eq. 1)$$

$$SSD(j) = \left[ \frac{\sum_{i=1}^{n} [X(i) - XB(j)]^2}{n-1} \right]^{\frac{1}{2}} \qquad (Eq. 2)$$

where:
(n) represents subgroup size;
(j) represents jth subgroup;
X(i) represents ith value of the controlled variable in subgroup j;
XB(j) represents mean value of subgroup j; and
SSD(j) represents sample standard deviation of subgroup (j).

The output of the statistical element 30, i.e., the mean-representative signal XB(j) and the standard deviation-representative signal SSD(j), is routed to a normalization element 32 that generates an error signal Y(j). The illustrated element 32 computes the error signal as follows:

$$Y(j) = \frac{XB(j) - TAR}{SSD(j)} \qquad (Eq. 3)$$

where:
TAR represents the target value for the controlled variable; and
Y(j) represents normalized deviation of the controlled variable from target for subgroup (j).

Those skilled in the art will appreciate that the error signal Y(j) is positive when the quantity XB(j) of (Eq.2) is above the value of the target signal, and is negative when XB(j) is below the value of the target signal.

With further reference to FIG. 2, the illustrated controller 12 further has a zero divide-prevention element 34 connected between the standard deviation SSD(j) output of the statistical element 30 and the normalization element 32. Element 34 compares the value of the signal SSD(j) with a minimum value signal MINSIG. If SSD(j) is less than that minimum value, the statistical element 34 sets SSD(j) equal to MINSIG; otherwise the value of SSD(j) is left unchanged. The value of MINSIG is preferably the smallest acceptable value for preventing element 32 from issuing a zero-divide fault signal. MINSIG can be input by the operator at run-time. However, it preferably is set by the operator as a default value.

The error signal Y(j) output from the normalization element 32 is routed as an input to each of a high-value accumulation element 35 and a low-value accumulation element 36. The former accumulates error signal values that are more than a high slack value, k1, greater than the target to generate a high-value accumulation signal, SH(j). The element 36 accumulates error signal values that are more than a low slack value, k2, less than the target, to generate a low-value accumulation signal SL(j).

As discussed above, the high slack value signal, k1, and the low slack value signal, k2, are independent of one another. That is, although the operator may input values (via line 19, FIG. 1) for k1 and k2 that are equal, or otherwise mathematically related, for example, where k1 equals one-half of k2, a process control system constructed in accord with this invention permits entry of, and can operate with, values for k1 and k2 which are unequal and/or otherwise unrelated.

The high-value accumulation element 35 generates a current high-value accumulation signal, SH(j), by first subtracting the value of the high slack value signal, k1, from the value of the error signal, Y(j); and by then adding the difference to the value of the prior high-value accumulation signal, SH(j−1).

The current high-value accumulation signal, SH(j), is routed to max-function element 38, which compares that signal against a signal representative of the value ZERO. If the max-function element 38 determines that the current high-value accumulation signal, SH(j), is less than ZERO, than the max-function element 38 generates a new high-value accumulation signal, SH(j), that is equal to ZERO. Otherwise, the max-function element 38 leaves the current high-value accumulation signal, SH(j), unchanged.

Likewise, element 36 generates a current low-value accumulation signal, SL(j), by subtracting the value of the low slack signal, k2, from the negated value of the error signal, Y(j), and by adding the difference to the value of the prior low-value accumulation signal, SL(j−1).

The current low-value accumulation signal, SL(j), is routed to max-function element 40, which compares that signal against a signal representative of the value ZERO. If the max-function element 40 determines that the current low-value accumulation signal, SL(j), is less than ZERO, than the max-function element 40 generates a new low-value accumulation signal, SL(j) that is equal to ZERO. Otherwise, the max-function element 40 leaves the current low-value accumulation signal, SL(j), unchanged.

Mathematically, the operation of the illustrated elements 35, 36, 38 and 40 is expressed as follows:

$$SH(j) = \max[0, SH(j-1) + Y(j) - k1] \qquad (Eq.4)$$

$$SL(j) = \max[0, SL(j-1) - Y(j) - k2] \qquad (Eq.5)$$

where:
SH(j) represents the value of the current high-value accumulation signal;
SH(j−1) represents the value of the prior high-value accumulation signal;
SL(j) represents the value of the current low-value accumulation signal;
SL(j−1) represents the value of the prior low-value accumulation signal;
k1 represents the value of the high-value slack signal;
k2 represents the value of the low-value slack signal; and
max[] represents a maximum function which outputs a value equal to the greatest of its input values.

The high-value accumulation signal, SH(j), is routed from the max-function element 38 to a comparator 42 that tests that signal against the high-value alarm signal, h1, to determine which is greater. If the comparator 42 determines that the high-value accumulation signal, SH(j), is greater, it applies a YES signal to a driver element 44 that responds by generating a ONE-value high-alarm signal, i.e., (HA=1). Otherwise, the comparator 42 applies a NO signal routed to a driver element 46 that responds by generating a ZERO-value high-alarm signal, i.e., (HA=0).

Likewise, the low-value accumulation signal, SL(j), is routed from the max-function element 40 to a comparator 48 that tests that signal against the low-value alarm signal, h2, to determine which is greater. If the comparator 48 determines that the low-value accumulation signal, SL(j), is greater, it applies a YES signal to a driver element 50 that responds by generating a ONE-value low-alarm signal, i.e., (LA=1). Otherwise, the driver element 50 applies a NO signal to a driver element 52 that responds by generating a ZERO-value low-alarm signal, i.e., (LA=0).

Like the aforementioned slack values, the high-value alarm signal, h1, and the low-value alarm signal, h2, may be independent of one another. That is, although the operator may input values for h1 and h2 that are equal or otherwise mathematically related, a process control system in accord with this invention permits entry of, and operates with, values for h1 and h2 that are unequal and/or otherwise unrelated.

The high-alarm signal, HA, produced by either of the driver elements 44 or 46 is routed to a multiplier 54. In response, the multiplier generates an output signal equal to the multiplicative product of the high-value accumulation signal, SH(j), the high-alarm signal, HA, and a high-alarm controller gain, KC1. Similarly, the low-alarm signal, HL, produced by either of the driver elements 50 or 52 is routed to a multiplier 56. That multiplier generates an output signal equal to the multiplicative product of the values of the low-value accumulation signal, SL(j), the low-alarm signal, HL, and a low alarm controller gain, KC2.

As above, signals representing the high alarm controller gain, KC1, and the low alarm controller gain, KC2, can be independent of one another. That is, although the operator may input values for KC1 and KC2 that are equal or otherwise mathematically related, a process control system constructed in accord with the teachings herein permits entry of values for KC1 and KC2 which are unequal and/or unrelated.

FIG. 2 also shows that the outputs of the multipliers 54 and 56 of the illustrated controller 12 are routed to a summing element 58. In response, it generates a difference signal representative of the value of multiplicative product signal generated by the multiplier 54 minus the value of the multiplicative product signal generated by the multiplier 56.

The output signal from the summing element 58 is routed to a second summing element 60, which generates a timewise-current, manipulated variable signal, M(j). That signal represents the sum of the difference signal output from the summing element 58 and the value of the timewise prior manipulated variable signal, M(j−1). The manipulated variable signal, M(j), is applied to the process control equipment as discussed above in conjunction with FIG. 1, for example, on the line 21.

Mathematically, the operation of the summing elements 58 and 60 can be described as follows:

$$M(j) = M(j-1) + KC1 * HA * SH(j) - KC2 * LA * SL(j) \quad \text{(Eq.6)}$$

where

M(j) represents the value of the current manipulated variable signal;

M(j−1) represents the value of the prior manipulated variable signal;

KC1 represents the gain of the controller 12 with respect to the high-value accumulation signal, SH(j); and KC2 represents the gain of the controller 12 with respect to the low-value accumulation signal, SL(j).

The high-alarm signal, HA, output from one of the driver elements 44 and 46 is also applied to two comparators 62 and 66. The former comparator 62 tests that signal to determine if it is greater than or equal to ONE. If so, the comparator 62 generates a YES signal which is applied to a reinitializing element 64. The YES signal actuates the reinitializing element 64 to reinitialize to ZERO each of the following signals (i) the high-value accumulation signal, SH(j); (ii) the prior high-value accumulation signal, SH(j−1); and (iii) the high-alarm signal, HA. Likewise, the comparator 66 tests the high-alarm signal, HA, to determine if it is less than or equal to ZERO. If so, the comparator 68 generates a YES signal which is routed to an assignment element 68, causing it to generate a prior high-value accumulation signal, SH(j−1), equal to the current high-value accumulation signal, SH(j).

The low-alarm signal, LA, produced by either of the driver elements 50 and 52, is also routed to two comparators 70 and 74. The former comparator 70 tests that signal to determine if it is greater than or equal to ONE. If so, the comparator 70 generates a YES signal which is routed to a reinitializing element 72. The YES signal actuates the reinitializing element 72 to reinitialize to ZERO each of the following signals: (i) the low-value accumulation signal, SL(j); (ii) the prior low-value accumulation signal, SL(j−1); and (iii) the low-alarm signal, LA. The comparator 74 tests the low-alarm signal, LA, to determine if it is less than or equal to ZERO. If so, the comparator 74 generates a YES signal which is applied to an assignment element 76, causing it to generate a timewise prior low-value accumulation signal, SL(j−1), equal to the current low-value accumulation signal, SL(j).

The output signals from the controller elements 64, 68, 72 and 76, and from the second summing element 60, are applied to a manipulated-variable assignment element (MVA element) 78. At the end of each process run or after a selected operating interval, the MVA element 78 prepares the controller to commence another run or operating interval by generating a prior manipulated variable signal, M(j−1), that is equal to the current manipulated variable signal, M(j). The MVA element 78, applies that output signal and the following other signals to the sampler 28 for repeating the control process: (i) the current and prior high-value accumulation signals, SH(j) and SH(j−1); (ii) the current and prior low-value accumulation signal, SL(j) and SL(j−1); (iii) the high and low alarm signals, HA and LA; and (iv) the current and prior manipulated variable signals, M(j) and M(j−1).

In operation, a process controller 12 constructed as shown in FIG. 2 utilizes sampling element 28 to generate successive sets of subgroup signals, X(1), X(2), ... X(n), representing sampled values of the controlled variable, e.g., paper brightness. The subgroup signals are routed to statistical element 30, which generates signals XB(j) and SSD(j) representing, respectively, the mean and standard deviation of the current subgroup. The signals XB(j) and SSD(j) are generated in accord with the foregoing Equations (1) and (2).

The mean and standard deviation signals are normalized with respect to a target value TAR by the normalization element 32, operating in concert with element 34, which generates an error signal Y(j) in accord with Equation (3) above.

Deviation of the controlled variable from the target value is detected by elements 34–40, which accumulates error signal values above and below the target. Independent variables, k1 and k2, which may be entered by the operator, provide slack in this accumulation process. The accumulated error values are represented by the signal SH(j) and SL(j), which have values that can be expressed as set forth in Equations (4) and (5) above.

Statistically significant shifts in the process are detected by elements 42–50, which drive the alarm signals HA and LA to one if the accumulated variables SH(j) and SL(j) exceed independent alarm limits, h1 and h2, respectively. In the event an alarm is signalled, elements 54–60 update the manipulated variable signal M(j) by adding (or subtracting) a scaled value of the error signal. This operation may be expressed mathematically as set forth above in Equation (6).

Prior to a next interaction of operation, the controller 12 resets signal values via elements 62–78, as described in detail above.

A statistical process controller 12 as shown in FIG. 2 can be implemented with special purpose hardware, or by programming general purpose digital data processing equipment. One preferred practice of the invention implements the controller 12 on a programmable digital data processor such as the Intelligent Automatic Series Application Processor 20 or the Intelligent Automatic Series Control Processor 36, both commercially available from the assignee hereof Control variable signals from the process 10, as well as alarm value signals, slack value signals and controller gains, can be applied as inputs to such controllers in a conventional manner. The desired manipulated variable signals generated by such controllers can also be applied to the process 10 in a conventional manner.

Figure 3:
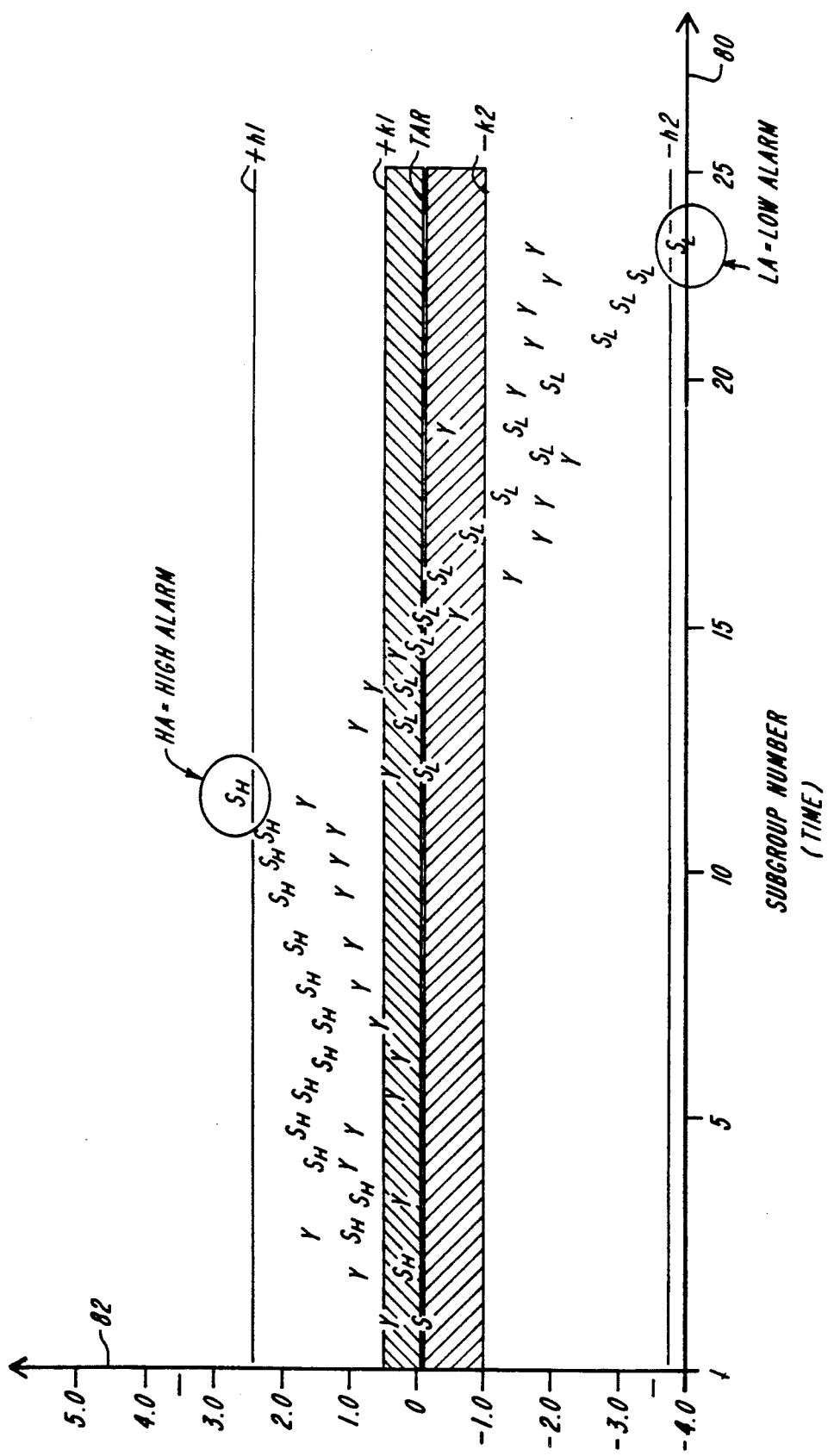
FIG. 3 is a graph depicting exemplary values of signals in process control apparatus according to the embodiment of the invention shown in FIG. 2.

FIG. 3 is an exemplary graph depicting the values of signals produced in process control equipment according to the invention and operating in accord with the above description. The x-axis 80 depicts the subgroup number (e.g., time), represented by the variable j above. The y-axis 82 depicts the numerical values of the high-value accumulation signal SH(j), the low-value accumulation signal SL(j), and the error signal Y(j). A horizontal line TAR denotes a target value for the controlled variable; line +k1 denotes the value of the high-slack signal; line +h1 denotes the value of the high-value alarm signal; line −k2 denotes the value of the low-slack signal; and line −h2 denotes the value of the low-value alarm signal.

In this illustration, numerical notations adjacent the y-axis 82 are to be interpreted relative to the target value TAR. For sake of clarity, the left-hand portion (subgroups #1 through #12) of the graph depicts only changes in the high-value accumulation signal $S_H$, while the right-hand portion (beginning with subgroup #13) depicts only changes in the low-value accumulation signal, denoted $S_L$.

In subgroup #1, the process 10 is placed under closed-loop control of the controller 12, with initialization carried out as described above in conjunction with the initialization element 27 (FIG. 2). In subgroups #2 and #3, the value of the error signal Y remains above the target, TAR, causing the high-value accumulation signal $S_H$ to increase. In subgroup #4, however, value of the error signal decreases, thereby decreasing $S_H$. As the process continues to operate above the target value, in subgroups #5 through #13, the accumulation signal $S_H$ gradually increases. In the last of those subgroups, the high-value accumulation signal exceeds the high-value alarm signal, h1, signalling a high alarm (i.e., causing the high alarm signal, HA, to be set to ONE).

As a result of the high alarm signal, the process 12 applies the manipulated variable signal M(j) to the process 10 and resets the accumulation signals. This is illustrated by subgroup #13, where $S_L$ is ZERO.

Subgroups #14 through #23 similarly illustrate the effect of a gradual drift of the process operation below the target on the low-value accumulation signal $S_L$. As above, in subgroup #23, the signal $S_L$ exceeds the low-alarm value, (−h2), causing the processor 12 to produce a low-alarm signal. Here again, in a process operating under closed-loop statistical control in the manner described above, the processor 12 applies the manipulated variable signal M(j) to the process and resets the accumulation signals.

It will then be seen that this invention provides an improved statistical process control apparatus and method that provides asymmetrical nonlinear automatic closed-loop feedback control. The system uses the accumulated deviation of subgroup means minus the target value, divided by the subgroup standard deviation, to modify the manipulated variable each time the accumulated value exceeds a decision interval above or below the target. The system permits the use of independent slack variables, alarm values, and controller gains to tailor or customize the controller to a given process and thus maintain the controlled variable closer to a desired target value.

Those skilled in the art will appreciate that the embodiment described above is exemplary only, and that other embodiments incorporating the teachings herein are within the scope of the claimed invention. Thus, for example, a controller constructed in accord with the invention may monitor a plurality of manipulated variable signals. Further, for example, the controller can read alarm value signals, slack value signals and/or controller gains from memory banks, in lieu of inputting those signals from the operator.

In view of the foregoing, what is claimed as new and secured by Letters Patent is:

1. An apparatus for closed-loop control of a process performed with equipment that responds to a controlled variable signal to vary a first characteristic of that process, said apparatus having the improvement comprising A. batch monitoring means for monitoring values of a first process characteristic of the process being performed and for generating a signal representative of an arithmetic mean of those monitored values and for generating a signal representative of a standard deviation of those monitored values, B. normalization means coupled to said batch monitoring means for responding to said mean value-representative signal and to said standard deviation-representative signal to generate an error signal representative of a normalized deviation of said monitored values, C. drift detection means coupled to said normalization means for responding to said error signal to detect a selected change in said first process characteristic, said drift detection means comprising i) first accumulation means for generating a high-value accumulation signal representative of a summation of time-successive values of a difference between said error signal and a first slack value, and ii) second accumulation means for generating a low-value accumulation signal representative of a summation of time-successive values of a difference between an additive inverse of said error signal and a second slack value, which may be independent of said first slack value, D. process control means coupled to said drift detection means for selectively generating a manipulated variable signal representative of a sum of a prior value of said manipulated variable signal and a scaled one of at least one of said high-value accumulation signal and said low-value accumulation signal, and E. closed-loop control means for applying said manipulated variable signal to the process-performing equipment to drive the controlled variable signal to a target value.

2. An apparatus according to claim 1, wherein said batch monitoring means comprises A. measuring means for measuring a value of said process first characteristic, B. sampling means coupled to said measuring means for forming a subgroup of values by sampling said first characteristic value (n) times and for generating a signal representative thereof, where (n) is an integer greater than ONE, and C. means for responding to said (n) sampled first characteristic values to generate said mean-representative signal and said standard deviation-representative signal.

3. An apparatus according to claim 2, wherein said sampling means comprises consecutive sample means for forming a subgroup by sampling said (n) first characteristic value-representative signals beginning every (n) values.

4. An apparatus according to claim 2, wherein said sampling means comprises skip-m sample means for forming a subgroup by sampling said (n) first characteristic value-representative signals beginning every (n+m) values, where (m) is an integer greater than or equal to ONE.

5. An apparatus according to claim 2, wherein said sampling means comprises moving sample means for forming a subgroup of previous ones of said sampled first characteristic values and combining those values with at least one newly sampled value.

6. An apparatus according to claim 1, wherein said normalization means comprises A. means for generating a signal representative of a numerical value of a difference between said mean-representative signal and a signal representative of said target value, and B. means for generating said error signal as representative of a numerical value of said difference-representative signal divided by said standard deviation-representative signal.

7. An apparatus according to claim 6, wherein said normalization means comprises ZERO divide-prevention means responsive to said standard deviation-representative signal having a value less than a selected minimum value for setting said standard deviation-representative signal equal to that minimum value.

8. An apparatus according to claim 6, including means for inputting said target value-representative signal from an operator.

9. An apparatus according to claim 1, wherein said drift detection means comprises A. first input means for receiving an operator-selectable first slack value, and B. second input means for receiving an operator-selectable second slack value.

10. An apparatus according to claim 1, wherein said first accumulation means comprises A. means for generating said high-value accumulation signal as a sum of a value of a prior said high-value accumulation signal and a difference between said error signal and a first slack value, and B. means for responding to said high-value accumulation signal having a value less than ZERO for setting that signal to represent a value of ZERO.

11. An apparatus according to claim 1, wherein said second accumulation means comprises A. means for generating said low-value accumulation signal as a sum of a value of a prior said low-value accumulation signal with a difference between an additive inverse of said error signal and a second slack value, and B. means for responding to said low-value accumulation signal having a value less than ZERO for setting that signal to represent a value of ZERO.

12. An apparatus according to claim 1, wherein said process control means comprises A. first alarm condition means for responding to said high-value accumulation signal having a value greater than a high-alarm value for generating a high-alarm signal, and B. second alarm condition means for responding to said low-value accumulation signal having a value greater than a low-alarm value for generating a low-alarm signal, which may be independent of said high-alarm value.

13. An apparatus according to claim 12, including means for inputting at least one of said high-alarm signal and said low-alarm signal from an operator.

14. An apparatus according to claim 12, wherein said process control means includes means responsive to said high-alarm signal for generating said manipulated variable signal as a sum of said prior value of said manipulated variable signal and a multiplicative product of said high-value accumulation signal and a high alarm controller gain value.

15. An apparatus according to claim 14, including means for inputting said high-alarm controller gain value from an operator.

16. An apparatus according to claim 12, wherein said process control means includes means responsive to said low-alarm signal for generating said manipulated variable as a sum of said prior value of said manipulated variable and a multiplicative product of said low-value accumulation signal and a low alarm controller gain value.

17. An apparatus according to claim 16, including means for inputting said low-alarm controller gain value from an operator.

18. An apparatus according to claim 12, wherein said process control means includes means responsive to at least one of said high-alarm signal and said low-alarm signal for generating said manipulated variable signal as a sum of a prior value of said manipulated variable signal and at least one of i) a multiplicative product of said high-value accumulation signal and a high alarm controller gain value, and ii) a multiplicative product of said low-value accumulation signal and a low alarm controller gain value.

19. An apparatus according to claim 18, including means for inputting at least one of said high alarm controller gain value and said low alarm controller gain value from an operator.

20. A method for closed-loop control of a process performed on equipment that responds to a controlled variable signal to vary a first characteristic of that process, said method having the improvement comprising the steps of A. monitoring values of a first process characteristic of the process being performed for generating a signal representative of an arithmetic mean of those monitored values and for generating a signal representative of a standard deviation of those monitored values, B. normalizing said standard deviation-representative signal to generate an error signal, C. responding to said error signal to detect a selected change in said plural time-successive values of said first process characteristic, said error-responding step including the steps of i) generating a high-value accumulation signal representative of a summation of time-successive values of differences between said error signal and a first slack value, and ii) generating a low-value accumulation signal representative of a summation of time-successive values of differences between an additive inverse of said error signal and a second slack value which may be independent of said first slack value, D. selectively generating a manipulated variable signal representative of a sum of a prior value of said manipulated variable signal and a scaled one of at least one of said high-value accumulation signal and said low-value accumulation signal, and E. applying said manipulated variable signal to the process performing equipment to drive the controlled variable signal toward a target value.

21. A method according to claim 20, wherein said monitoring step comprises

A. measuring a value of said first process characteristic,

B. forming a subgroup of values by sampling said first characteristic value (n) times and for generating a signal representative thereof, where (n) is an integer greater than ONE, and C. responding to said (n) sampled first characteristic values to generate said mean value-representative signal and said standard deviation-representative signal.

22. A method according to claim 21, further comprising the step of forming said subgroup by sampling said (n) first characteristic value-representative signals beginning every (n) values.

23. A method according to claim 21, further comprising the step of forming said subgroup by sampling said (n) first characteristic value-representative signals beginning every (n+m) values, where (m) is an integer greater than or equal to ONE.

24. A method according to claim 21, further comprising forming said subgroup from previous ones of said sampled first characteristic values and combining those values with at least one newly sampled value.

25. A method according to claim 20, wherein said normalizing step comprises the steps of A. generating a signal representative of a numerical value of a difference between said mean value-representative signal and a signal representative of said target value of said first characteristic, and B. generating said error signal as representative of a numerical value of said difference-representative signal divided by said standard deviation-representative signal.

26. A method according to claim 25, wherein said normalizing step comprises the step of responding to said standard deviation-representative signal having a value less then a selected minimum value for setting said standard deviation-representative signal equal to that minimum value.

27. A method according to claim 25, further comprising the step of receiving said target value-representative signal from an operator input device.

28. A method according to claim 20, wherein said error-responding step comprises the step of receiving each of said first and second slack values from an operator input device.

29. A method according to claim 20, wherein said high-value accumulation signal generating step comprises the steps of A. generating said high-value accumulation signal as a sum of a value of a prior said high-value accumulation signal and a difference between said error signal and a first slack value, and B. responding to said high-value accumulation signal having a value less than ZERO for setting that signal to have a value of ZERO.

30. A method according to claim 29, further comprising the step of receiving said first slack value from an operator input device.

31. A method according to claim 20, wherein said low-value accumulation signal generating step comprises the steps of A. generating said low-value accumulation signal as a sum of a value of a prior said low-value accumulation signal and a difference between an additive inverse of said error signal and a second slack value, and B. responding to said low-value accumulation signal having a value less than ZERO for setting that signal to have a value of ZERO.

32. A method according to claim 31, further comprising the step of receiving said second slack value from an operator input device.

33. A method according to claim 20, wherein said process control signal generating step comprises the steps of A. responding to said high-accumulation signal having a value greater than a high-alarm value for generating a high-alarm signal, and B. responding to said low-accumulation signal having a value greater than a low-alarm value for generating a low-alarm signal, said low-alarm value which may be independent of said high-alarm value.

34. A method according to claim 33, wherein said process control signal generating step comprises the step of generating said process control signal as a sum of said prior value of said process control signal and a multiplicative product of said high-accumulation signal and a high-alarm controller gain.

35. A method according to claim 34 comprising the further step of receiving said high alarm controller gain from an operator input device.

36. A method according to claim 33, wherein said process control signal generating step comprises the step of generating said process control signal as a sum of said prior value of said process control signal and a multiplicative product of said low-accumulation signal and a low-alarm controller gain.

37. A method according to claim 36 comprising the further step of receiving said low alarm controller gain from an operator input device.

38. A method according to claim 33, wherein said process control signal generating step comprises at least one of the steps of
A. generating said process control signal as a sum of said prior value of said process control signal and a multiplicative product of said high-accumulation signal and a high-alarm controller gain, and
B. generating said process control signal as a sum of said prior value of said process control signal and a multiplicative product of said low-accumulation signal and a low-alarm controller gain.

39. A method according to claim 38, comprising the step receiving at least one of said high-alarm controller gain and said low-alarm controller gain from an operator input device.

* * * * *